US010548200B1

(12) United States Patent
Xu

(10) Patent No.: US 10,548,200 B1
(45) Date of Patent: Jan. 28, 2020

(54) AUTOMOTIVE LIGHTING WITH AUTOMATIC BRIGHTNESS ADJUSTMENT

(71) Applicant: Zhongshan Easdar Optoelectronic Technology Co., Ltd, Zhongshan (CN)

(72) Inventor: Baozhou Xu, Zhongshan (CN)

(73) Assignee: ZHONGSHAN EASDAR OPTOELECTRONIC TECHNOLOGY CO., LTD, Zhongshan (CN)

( * ) Notice: Subject to any disclaimer, the term of this patent is extended or adjusted under 35 U.S.C. 154(b) by 0 days.

(21) Appl. No.: 16/436,935

(22) Filed: Jun. 11, 2019

(30) Foreign Application Priority Data

Apr. 12, 2019 (CN) .................... 2019 2 0503643 U

(51) Int. Cl.
| | |
|---|---|
| *F21V 29/00* | (2015.01) |
| *H05B 33/08* | (2006.01) |
| *G01K 7/00* | (2006.01) |
| *F21K 9/278* | (2016.01) |
| *F21V 29/74* | (2015.01) |
| *F21V 29/67* | (2015.01) |
| *F21Y 115/10* | (2016.01) |

(52) U.S. Cl.
CPC ......... *H05B 33/0893* (2013.01); *F21K 9/278* (2016.08); *F21V 29/677* (2015.01); *F21V 29/74* (2015.01); *G01K 7/00* (2013.01); *F21Y 2115/10* (2016.08)

(58) Field of Classification Search
CPC ........ F21V 29/74; F21V 29/83; F21V 29/507; F21V 29/677; F21V 29/773

USPC ......................................... 362/294, 373, 382
See application file for complete search history.

(56) References Cited

U.S. PATENT DOCUMENTS

| | | | |
|---|---|---|---|
| 2005/0174780 A1* | 8/2005 | Park .......................... | F21V 3/02 |
| | | | 362/294 |
| 2010/0149822 A1* | 6/2010 | Cogliano .................. | F21S 8/02 |
| | | | 362/365 |
| 2010/0165632 A1* | 7/2010 | Liang ........................ | F21V 3/00 |
| | | | 362/294 |
| 2011/0279015 A1* | 11/2011 | Negley .............. | H05B 33/0857 |
| | | | 313/501 |
| 2011/0304268 A1* | 12/2011 | Bertram .................... | F21V 3/00 |
| | | | 315/46 |
| 2017/0198898 A1* | 7/2017 | Ro ..................... | H05B 33/0803 |

* cited by examiner

*Primary Examiner* — Tung X Le

(74) *Attorney, Agent, or Firm* — Gokalp Bayramoglu

(57) ABSTRACT

An automotive lighting with automatic brightness adjustment includes a radiator, a light source baseplate in the radiator, a LED lamp on the light source baseplate, a temperature sensor on the light source baseplate and on a side of the LED lamp, a driving power circuit board electrically connected to the LED lamp and the temperature sensor, and a driving IC on the driving power circuit board and electrically connected to the LED lamp and the temperature sensor through the driving power circuit board. The radiator has a light transmission part corresponding to the LED lamp. The driving IC of the present application adjusts the brightness of the LED lamp through the temperature sensor sensing a temperature of the environment where the LED lamp is located.

7 Claims, 2 Drawing Sheets

AUTOMOTIVE LIGHTING WITH AUTOMATIC BRIGHTNESS ADJUSTMENT

CROSS REFERENCE TO THE RELATED APPLICATIONS

This application is based upon and claims priority to Chinese Patent Application No. 201920503643.6, filed on Apr. 12, 2019, the entire contents of which are incorporated herein by reference.

TECHNICAL FIELD

The present invention belongs to the technical field of automotive lighting, particularly relates to an automotive lighting with automatic brightness adjustment.

BACKGROUND

With the development of science and technology, LED lamps have been widely applied to vehicles. However, the LED lamps are prone to generate high temperature, and due to small volumes of the LED lamps, heat is concentrated, and heat conduction is difficult. Therefore, the LED lamps are in a high-temperature environment for a long time. The high-temperature environment will accelerate aging of LED chips, thereby affecting service life of the LED lamps.

SUMMARY

To solve the above problems, the present invention provides an automotive lighting with automatic brightness adjustment capable of controlling a heat generation of a LED lamp by adjusting a brightness of the LED lamp according to an environment temperature.

The present application is implemented by the following technical solutions.

The automotive lighting with automatic brightness adjustment includes a radiator, a light source baseplate provided in the radiator, a LED lamp provided on the light source baseplate, a temperature sensor provided on the light source baseplate and located on a side of the LED lamp, a driving power circuit board electrically connected to the LED lamp and the temperature sensor, and a driving integrated circuit (IC) provided on the driving power circuit board and electrically connected to the LED lamp and the temperature sensor through the driving power circuit board. The radiator is provided with a light transmission part corresponding to the LED lamp.

According to the above-mentioned automotive lighting with automatic brightness adjustment, the radiator includes two radiating shells oppositely connected to each other. The light source baseplate is provided between the two radiating shells. Each of the radiating shells includes a support bracket and a radiating fin assembly provided at an end of the support bracket. The radiator further includes a radiating fan provided between two radiating fin assemblies.

According to the above-mentioned automotive lighting with automatic brightness adjustment, the light transmission part is provided on the support bracket. The light source baseplate is provided with a heat pipe for transferring heat emitted by the LED lamp to the radiating fin assemblies.

According to the above-mentioned automotive lighting with automatic brightness adjustment, the light source baseplate stretches across the support bracket and the radiating fin assemblies. The heat pipe is provided on an edge of each of two sides of the light source baseplate extending along a length direction of the light source baseplate and extends between the two radiating fin assemblies.

According to the above-mentioned automotive lighting with automatic brightness adjustment, respective ends of the heat pipes on the edges of two sides of the light source baseplate close to the radiating fin assembly are connected to each other.

According to the above-mentioned automotive lighting with automatic brightness adjustment, the heat pipe is provided with an adaptor baseplate located between the two radiating fin assemblies and electrically connected to the LED lamp and the temperature sensor. A power supply wire is provided between the two radiating fin assemblies, extending outside the radiator to connect the adaptor baseplate and the driving power circuit board.

According to the above-mentioned automotive lighting with automatic brightness adjustment, the above-mentioned automotive lighting with automatic brightness adjustment further includes a chunk sleeved outside two support brackets and clamped with the two radiating fin assemblies to make the two radiating shells oppositely connected to each other.

According to the above-mentioned automotive lighting with automatic brightness adjustment, a seal ring is provided between the chuck and the radiating fin assembly.

Compared with the prior art, the present invention has the following advantages.

The driving IC of the present application adjusts the brightness of the LED lamp through the temperature sensor sensing the temperature of the environment where the LED lamp is located in real time. If the temperature sensor senses that the temperature of the environment where the LED lamp is located is too high, the driving IC will automatically reduce the brightness of the LED lamp to reduce the heat produced by the LED lamp, thereby reducing the temperature of the environment where the LED lamp is located, so as to ensure the LED lamp will not continuously stay in the high-temperature environment, effectively preventing the high-temperature environment from damaging the LED lamp and prolonging the service life of the LED lamp.

BRIEF DESCRIPTION OF THE DRAWINGS

To illustrate the technical solution in the embodiment of the present invention clearer, figures used in the description of the present embodiment will be briefly described as below.

DETAILED DESCRIPTION OF THE EMBODIMENTS

Figure 1:
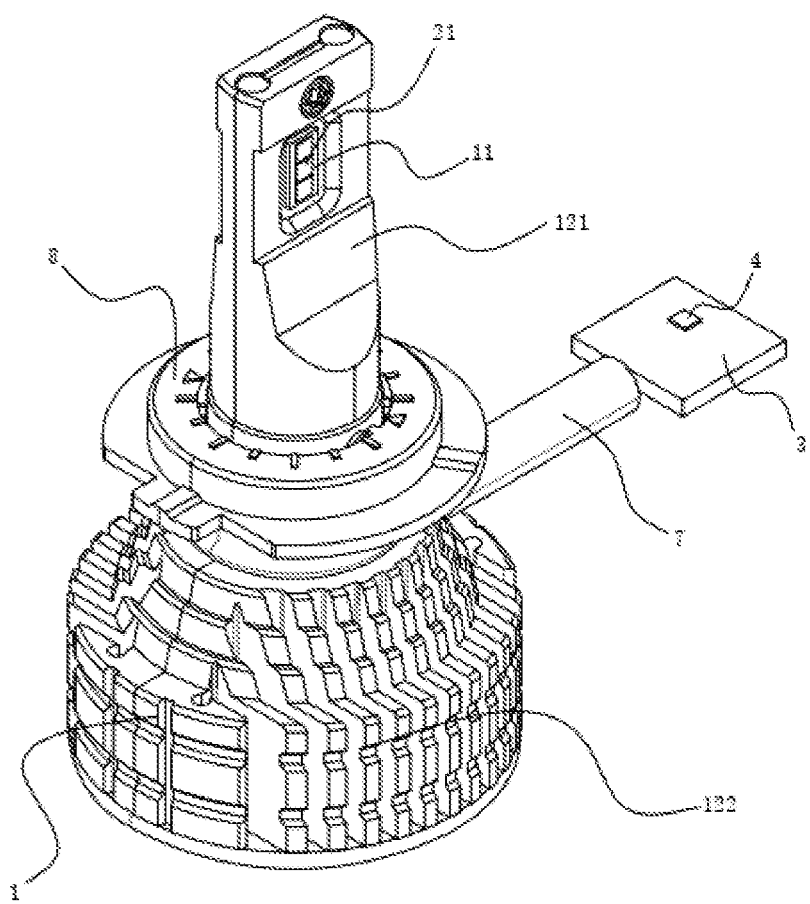
FIG. 1 is a schematic diagram of an automotive lighting with automatic brightness adjustment.
Figure 2:
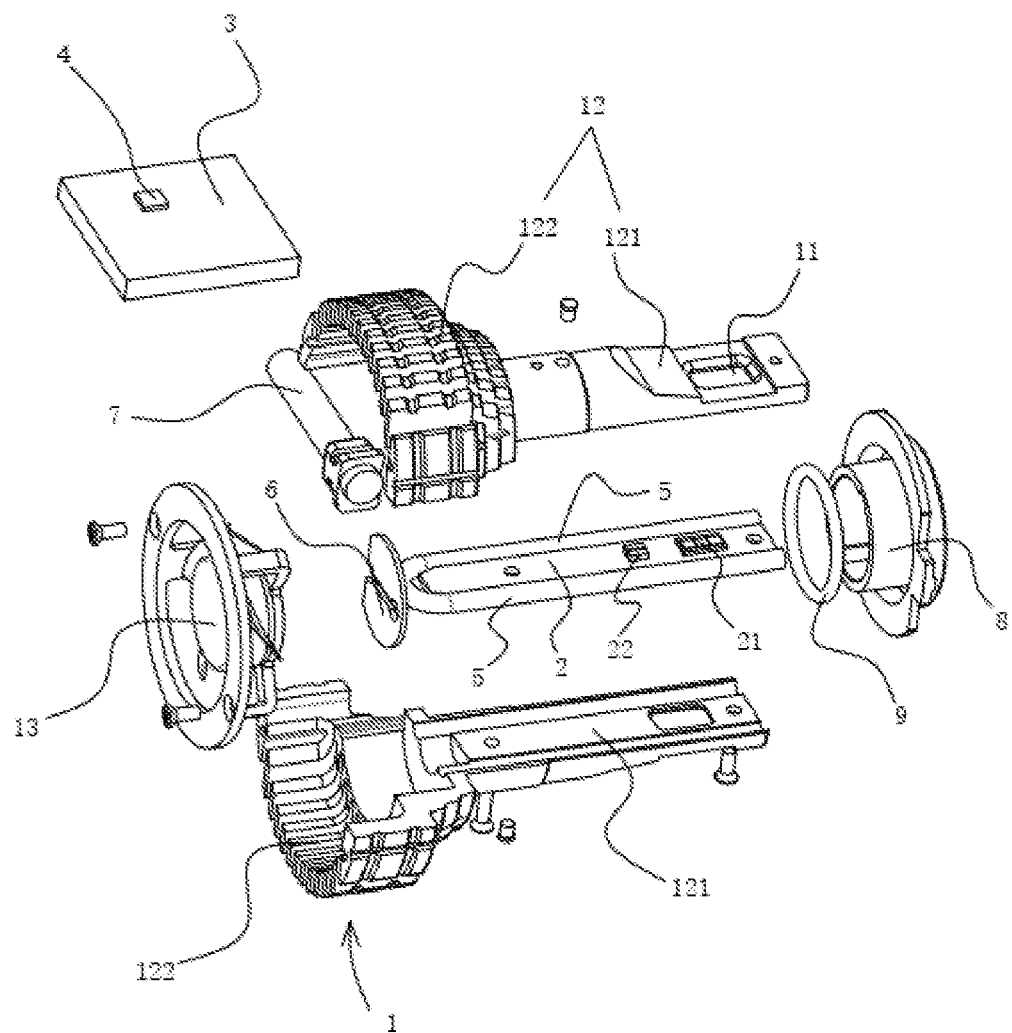
FIG. 2 is an exploded view of FIG. 1.

As shown in FIG. 1 and FIG. 2, an automotive lighting with automatic brightness adjustment includes the radiator 1, the light source baseplate 2 provided in the radiator 1, the LED lamp 21 provided on the light source baseplate 2, the temperature sensor 22 provided on the light source baseplate 2 and located on a side of the LED lamp 21, the driving power circuit board 3 electrically connected to the LED lamp 21 and the temperature sensor 22, and the driving IC 4 provided on the driving power circuit board 3 and electrically connected to the LED lamp 21 and the temperature sensor 22 through the driving power circuit board 3. The radiator 1 is provided with the light transmission part 11 corresponding to the LED lamp 21. If the temperature sensor 22 senses a temperature of an environment where the LED lamp 21 is located is too high, the driving IC 4 will reduce a brightness of the LED lamp 21 to reduce a heat produced by the LED lamp 21, thereby reducing the temperature of the environment wherein the LED lamp 21 is located. Specifically, the driving IC has a model number of OC5031 or OST23-6, and the temperature sensor 22 is a thermistor with a model number of EWTF05-103J3T-N. The driving IC in the present embodiment adjusts the brightness of the LED lamp through the temperature sensor sensing the temperature of the environment where the LED lamp is located in real time. If the temperature senses that the temperature of the environment where the LED lamp is located is too high, the driving IC will automatically reduce the brightness of the LED lamp to reduce the heat produced by the LED lamp, thereby reducing the temperature of the environment where the LED lamp is located, so as to ensure the LED lamp will not continuously stay in the high-temperature environment, effectively preventing the high-temperature environment from damaging the LED lamp and prolonging the service life of the LED lamp.

In order to effectively dissipate the heat of the LED lamp, the radiator 1 includes two radiating shells 12 oppositely connected to each other. The light source baseplate 2 is provided between the two radiating shells 12. Each of the two radiating shells 12 includes the support bracket 121 and the radiating fin assembly 122 provided at an end of the support bracket 121. The radiator 1 further includes the radiating fan 13 provided between the two radiating fin assemblies 122. After a heat dissipation of the radiator, if the temperature sensor senses that the temperature of the environment where the LED lamp is located is normal, the driving IC will automatically increase the brightness of the LED lamp to satisfy users' requirement for illumination.

In order to improve the heat-dissipation efficiency of the LED lamp, the light transmission part 11 is provided on the support bracket 121. The light source baseplate 2 is provided with a heat pipe 5 for transferring heat emitted by the LED lamp 21 to the radiating fin assembly 122. By providing the heat pipe, more heat produced by the LED lamp during operation can be transferred to the radiating fin assembly for heat dissipation, further improving the heat-dissipation effect of the LED lamp.

In order to further improve the heat-dissipation effect, the light source baseplate 2 stretches across the support bracket 121 and the radiating fin assembly 122. The heat pipe 5 is provided on an edge of each of two sides of the light source baseplate 2 extending along a length direction of the light source baseplate and extends between the two radiating fin assemblies 122. Moreover, respective ends of the heat pipes 5 on the edges of the two sides of the light source baseplate 2 close to the radiating fin assembly 122 are connected to each other.

In order to conveniently make the driving power circuit board 3 and the driving IC 4 electrically connected to the LED lamp 21 and the temperature sensor 22, the adapter baseplate 6 located between the two radiating fin assemblies 122 and electrically connected to the LED lamp 21 and the temperature sensor 22 is provided on the heat pipe 5. The power supply wire 7 is provided between the two radiating fin assemblies, extending outside the radiator 1 to connect the adapter baseplate 6 with the driving power circuit board 3.

To ensure a firm connection between the two radiating shells, the automotive lighting with automatic brightness adjustment further includes the chunk 8 sleeved outside two support brackets 121 and clamped with the two radiating fin assemblies 122 to make the two radiating shells 12 oppositely connected to each other.

To enhance sealing performance of products, the seal ring 9 is provided between the chuck 8 and the radiating fin assembly 122.

The working principle of the present embodiment is described as below.

The driving IC adjusts the brightness of the LED lamp through the temperature sensor sensing the temperature of the environment where the LED lamp is located in real time. If the temperature sensor senses that the temperature of the environment where the LED lamp is located is too high, the driving IC will automatically reduce the brightness of the LED lamp to reduce the heat produced by the LED lamp, thereby reducing the temperature of the environment where the LED lamp is located, so as to ensure the LED lamp will not continuously stay in the high-temperature environment.

The above description is one embodiment based on the detailed content, and the specific embodiments of present invention are not merely limited to the description. Anything similar and equivalent to the method and structure of the present application, or any technical evolutions and substitutions based on the inventive concept of the present application, should all be considered as falling within the scope of the present application.

What is claimed is:

1. An automotive lighting with automatic brightness adjustment, comprising: a radiator, a light source baseplate provided in the radiator, a LED lamp provided on the light source baseplate, a temperature sensor provided on the light source baseplate and located on a side of the LED lamp, a driving power circuit board electrically connected to the LED lamp and the temperature sensor, and a driving IC provided on the driving power circuit board and electrically connected to the LED lamp and the temperature sensor through the driving power circuit board, wherein the radiator is provided with a light transmission part corresponding to the LED lamp; the radiator comprises two radiating shells oppositely connected to each other; the light source baseplate is provided between the two radiating shells; each of the two radiating shells comprises a support bracket and a radiating fin assembly provided at an end of the support bracket and the radiator further comprises a radiating fan provided between two radiating fin assemblies.

2. The automotive lighting with automatic brightness adjustment according to claim 1, wherein the light transmission part is provided on the support bracket, the light source baseplate is provided with heat pipes for transferring heat emitted by the LED lamp to the two radiating fin assemblies.

3. The automotive lighting with automatic brightness adjustment according to claim 2, wherein the light source baseplate stretches across the support bracket and the two radiating fin assemblies, the heat pipes are provided on edges of two sides of the light source baseplate extending along a length direction of the light source baseplate and extends between the two radiating fin assemblies.

4. The automotive lighting with automatic brightness adjustment according to claim 3, wherein respective ends of the heat pipes on the edges of the two sides of the light source baseplate close to the two radiating fin assemblies are connected to each other.

5. The automotive lighting with automatic brightness adjustment according to claim 3, wherein an adapter baseplate located between the two radiating fin assemblies and electrically connected to the LED lamp and the temperature sensor is provided on the heat pipes, a power supply wire is provided between the two radiating fin assemblies, extending outside the radiator to connect the adapter baseplate and the driving power circuit board.

6. The automotive lighting with automatic brightness adjustment according to claim 1, wherein the automotive lighting with automatic brightness adjustment further comprises a chunk sleeved outside two support brackets and clamped with the two radiating fin assemblies to make the two radiating shells oppositely connected to each other.

7. The automotive lighting with automatic brightness adjustment according to claim 6, wherein a seal ring is provided between the chuck and the two radiating fin assemblies.

* * * * *